United States Patent [19]

Junker

[11] Patent Number: 4,479,405

[45] Date of Patent: Oct. 30, 1984

[54] APPARATUS FOR CUTTING SAW TEETH INTO SAW BLADES OR SAW BANDS

[76] Inventor: Erwin Junker, 78 Talstrasse, 7611 Nordrach Baden, Fed. Rep. of Germany

[21] Appl. No.: 528,984

[22] Filed: Sep. 2, 1983

Related U.S. Application Data

[63] Continuation of Ser. No. 272,120, Jun. 10, 1981, Pat. No. 4,434,685.

[30] Foreign Application Priority Data

Jun. 13, 1980 [DE] Fed. Rep. of Germany ....... 3022292

[51] Int. Cl.³ .............................................. B23D 63/12
[52] U.S. Cl. ................................... 76/38; 125/11 CD; 409/11; 409/17
[58] Field of Search ................. 76/37, 38, 43, 45, 112; 409/11, 17; 125/11 CD; 51/76 BS, 77 BS, 80 BS, 81 BS, 82 BS, 83 BS, 84 BS, 85 BS, 86 BS, 87 BS, 91 BS, 92 BS, 98 BS, 109 BS

[56] References Cited

U.S. PATENT DOCUMENTS

| 1,378,611 | 5/1921 | Pittman ................................. 76/38 |
| 1,550,913 | 8/1925 | Marsh . |
| 2,388,183 | 10/1945 | Rickenmann . |

FOREIGN PATENT DOCUMENTS

| 353458 | 2/1920 | Fed. Rep. of Germany . |
| 916922 | 7/1954 | Fed. Rep. of Germany . |
| 933127 | 8/1955 | Fed. Rep. of Germany . |
| 2717111 | 10/1978 | Fed. Rep. of Germany . |
| 1038388 | 9/1953 | France . |
| 311523 | 6/1929 | United Kingdom . |

Primary Examiner—E. R. Kazenske
Assistant Examiner—Douglas D. Watts
Attorney, Agent, or Firm—Wenderoth, Lind & Ponack

[57] ABSTRACT

An apparatus for forming a saw blade or saw band by forming saw teeth in a solid stock moving continuously in a longitudinal direction includes a grinding wheel mounted for rotation about an axis which is inclined at an acute angle to and which diverges from the direction of movement of the stock. The grinding wheel has a generally frusto-conical configuration and an outer periphery defined by first and second axially distinct helical grinding ribs having different contours.

3 Claims, 3 Drawing Figures 4,479,405

APPARATUS FOR CUTTING SAW TEETH INTO SAW BLADES OR SAW BANDS

This is a continuation of application Ser. No. 272,120 filed June 10, 1981, now U.S. Pat. No. 4,434,685.

TECHNICAL FIELD

The invention relates to apparatus for cutting teeth into a saw blade or saw band solid stock by means of at least one grinding wheel.

BACKGROUND OF THE INVENTION

It has been known by West German Laid-Open Application (DE-OS) No. 2,717,111 to provide teeth on saw blades or saw bands by means of one single grinding wheel to individually cut each tooth from solid stock. However, it is not possible in this way to manufacture the saw band in a single pass without separately finishing the teeth.

West German Patent No. 916,922 describes a device for finishing the teeth on saw blades and which includes a tapered grinding wheel mounted for rotation about an axis extending at an acute angle to the direction of linear work advance. However, the grinding wheel shaft has to perform an oscillatory pivoting movement so that the overall arrangement is complicated and expensive.

Accordingly, it is the main object of the present invention to provide teeth having positive cutting angles on saw blades or saw bands by progressively grinding the solid stock in a single processing pass.

SUMMARY OF THE INVENTION

In accordance with the invention, a conical grinding wheel is mounted for rotation about an axis extending at an acute angle to the direction of linear work advance and has helically extending grinding ribs thereon.

Advantageously, a reduced external diameter portion is interposed between the grinding ribs for grinding the cutting face and the grinding ribs for grinding the tip and the trailing surface of each saw tooth.

Advantageously, instead of only one, two conical grinding wheels are mounted in a spaced-apart relationship on a common shaft and have their helical grinding ribs contoured to conform with the desired tooth shape of the saw blade to be produced.

A main advantage of the apparatus according to the present invention is that it is technically simple and enables saw teeth of a desired shape and having a positive cutting angle to be machined into the stock in a simple and continuous manner. A further advantage is that production rates hitherto thought unattainable are possible now because each revolution of the grinding wheel, which has a relatively great diameter in accordance with the technical conditions extant, causes one tooth to be ground completely into the stock which moves linearly by the processing station in its longitudinal direction. As a result, no separate finishing treatment of the teeth will be necessary.

BRIEF DESCRIPTION OF THE DRAWINGS

These and other features and advantages will be apparent from the following explanation of an embodiment of the present invention as shown in the attached drawings provided to facilitate an understanding of the invention, and wherein.

DESCRIPTION OF PREFERRED EMBODIMENT

Figure 1:
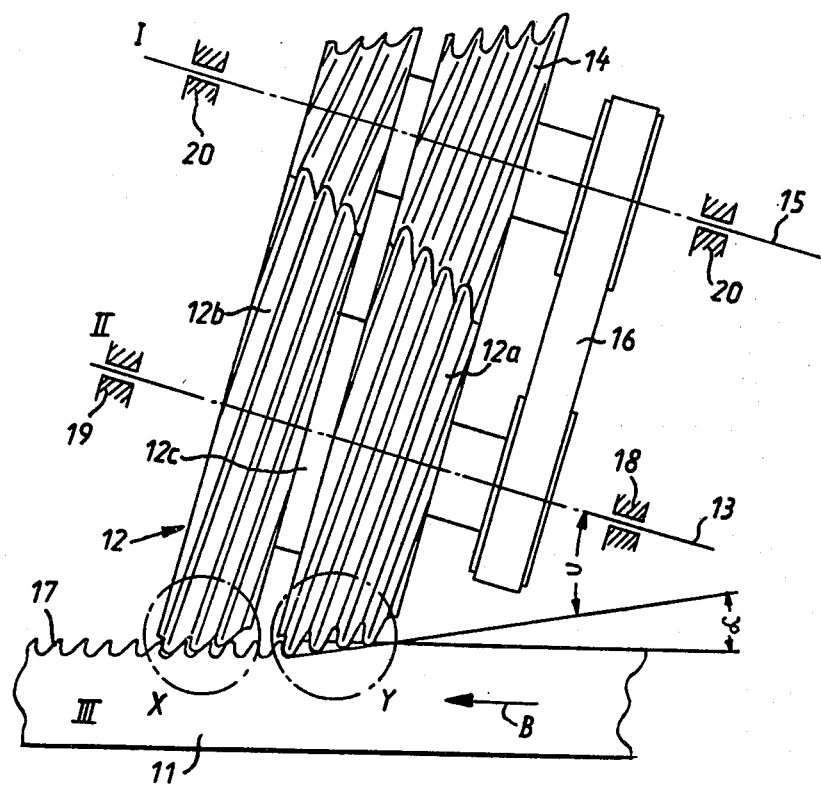
FIG. 1 is a schematic view showing how teeth are ground on a saw band intended for a band-type saw.

FIG. 1 shows a grinding wheel 12 mounted on a shaft 13 journalled in bearings 18, 19 in such manner that the shaft and thus the axis of the grinding wheel extend at an acute angle to the direction B of movement of the work 11. In the embodiment shown, the work 11 comprises flat strip stock intended to have saw teeth ground therein so that the finished band may be used as a saw blade particularly in band-type saws.

Grinding wheel 12 is conical in outline and has two spaced-apart sections 12a, 12b and between them a section 12c of which the outer diameter is smaller than the diameter of the conical grinding ribs. Similar to threads, the grinding ribs are formed helically on the peripheral surface of grinding wheel 12 and are contoured in a specific manner. This contour is adjusted by means of a diamond truing wheel 14 mounted on a shaft 15 extending in parallel with shaft 13 and journalled in bearings 2o. In the embodiment shown, truing wheel 14 is coupled to grinding wheel 12 by a driving connection 16.

The grinding wheel is arranged relative to work 11 in such manner that section 12a progressively grinds the root or bottom and the leading face of each tooth 17. At the same time, grinding wheel section 12b causes the trailing surfaces of the teeth to be ground in a manner to form a tip 26 on each tooth 17.

It is noted that the axis of the grinding wheels extends at an angle to work 11 or its direction of movement B in order to form each tooth with a positive cutting angle.

Figure 2:
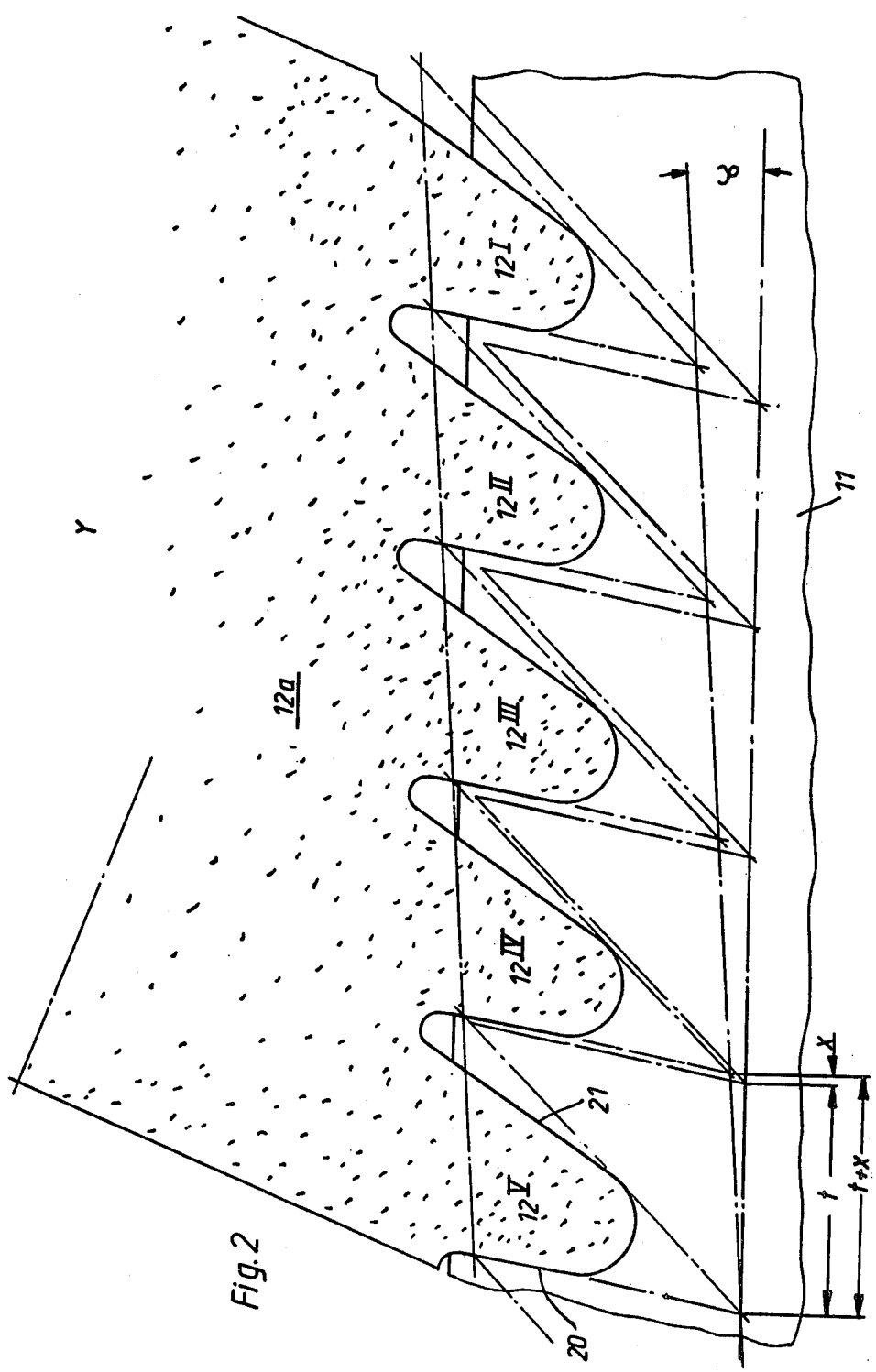
FIGS. 2 and 3 are enlarged views of details from circles Y and X, respectively, in FIG. 1.
Figure 3:
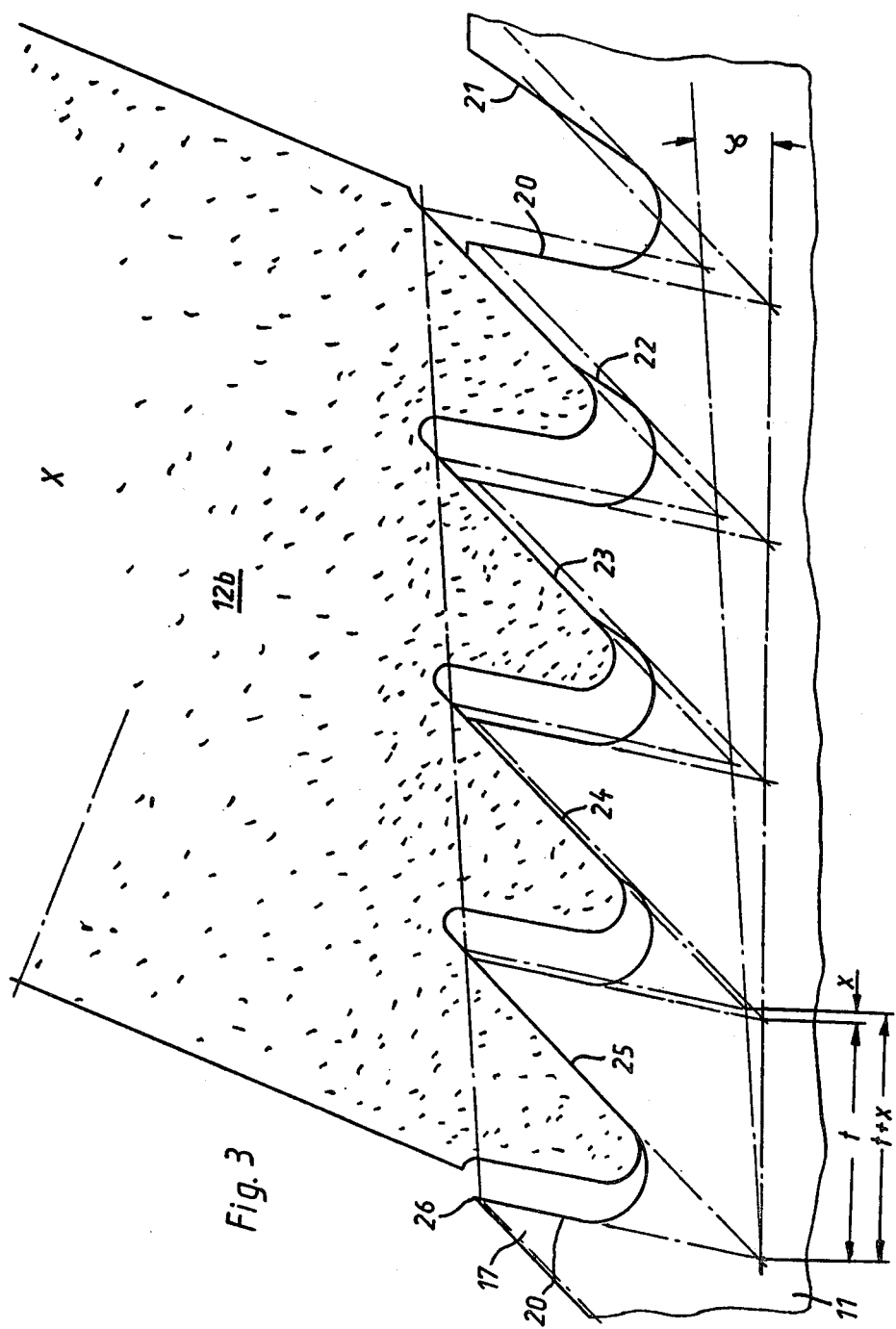

FIGS. 2 and 3 show enlarged details from circles Y and X in FIG. 1. As shown in FIG. 2, grinding ribs $12^{I}$, $12^{II}$, $12^{III}$, $12^{IV}$ and $12^{V}$ of grinding wheel section 12a progressively cut in the spaces between the teeth, with this cutting wheel section and particularly grinding rib $12^{V}$ finishing the leading cutting faces 2o as well as the bottoms of the recesses between the teeth. As mentioned above, the grinding wheels are mounted at an acute angle to work 11 so that each saw tooth will be worked to a positive cutting angle.

According to FIG. 3, the individual ribs on grinding wheel section 12b grind the trailing surfaces 22, 23, 24 and, finally, 25 in such manner that each tooth will ultimately be ground to a tip. As shown in FIGS. 2 and 3, the bottoms between the grinding ribs are radiused because it is not possible technically, or it is too expensive, to prepare a grinding wheel recessed to a sharp angular corner between adjacent ribs.

Each revolution of grinding wheel 12 on shaft 13 causes one tooth to be ground completely into the saw blade, which is intended particularly for use in a band-type saw. Also, it is to be noted that trailing surface 25 on each tooth need not be rectilinear; it may have a variety of contours as provided by the shape of grinding wheel 12.

As a result, the teeth in the saw band are worked in by means of a grinding wheel until completed, with the axis of the grinding wheel extending at an acute angle to the longitudinal direction of the saw blade to form a positive cutting angle on the teeth. At any time, the desired contour of the grinding ribs on the wheel is available in accordance with the product which is to be processed. The grinding rib on the wheel extends in a helix. As the diameter of grinding wheel 12 is relatively great, high peripheral wheel speeds will result in correspondingly high production rates for saw blade 11.

The apparatus described hereinabove is extremely simple; also, no highly skilled personnel will be necessary. Another important feature is that a grinding wheel having an exemplary diameter of 800 mm (31.5 inches) may be used to produce 200 mm (7.9 inches) of saw band material per second, provided a suitable grinding rate is used.

While particular embodiments of the instant invention are described above for purposes of illustration, it is understood that other modifications and variations will occur to those skilled in the art. The invention accordingly is not to be taken as limited except by the scope of the appended claims.

What is claimed is:

1. An apparatus for forming a saw blade or a saw band by forming saw teeth in a solid stock moving continuously in a longitudinal direction, said apparatus comprising:

grinding wheel means for grinding away portions of the stock to form saw teeth therein;

said grinding wheel means being mounted for rotation about an axis which is inclined at an acute angle to and which diverges from the direction of movement of the stock; and said grinding wheel means having a generally frusto-conical configuration and an outer periphery defined by first and second axially distinct helical grinding ribs having different contours, each of said first and second grinding rib comprising means dimensioned for forming identical portions of each successive saw tooth formed in the stock.

2. An apparatus as claimed in claim 1, wherein said first grinding rib is located upstream of said second grinding rib with respect to the direction of movement, said first grinding rib has a contour to progressively form the bottom and leading face of each saw tooth to be formed in the stock, and said second grinding rib has a contour to progressively form the trailing surface and tip of each said saw tooth.

3. An apparatus as claimed in claim 1, wherein said first and second grinding ribs are separated along said axis by a space defined by a reduced diameter section of said grinding wheel means.

* * * * *